US012565181B2

(12) United States Patent
Shahriari et al.

(10) Patent No.: US 12,565,181 B2
(45) Date of Patent: Mar. 3, 2026

(54) SYSTEMS AND METHODS FOR ADJUSTING A TRAILER BRAKE GAIN TO OPTIMIZE VEHICLE EFFICIENCY WHEN TOWING

(71) Applicant: GM GLOBAL TECHNOLOGY OPERATIONS LLC, Detroit, MI (US)

(72) Inventors: Mohammadali Shahriari, Markham (CA); Ashraf Abualfellat, Grand Blanc, MI (US); Henry Warren Grasman, Flushing, MI (US); Christopher Ratliff, Linden, MI (US); Reza Zarringhalam, Whitby (CA); Brian Porto, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 18/465,659

(22) Filed: Sep. 12, 2023

(65) Prior Publication Data

US 2025/0083651 A1     Mar. 13, 2025

(51) Int. Cl.
  B60T 8/17       (2006.01)
  B60L 7/10       (2006.01)
  B60T 8/172      (2006.01)
(52) U.S. Cl.
  CPC .............. B60T 8/1708 (2013.01); B60L 7/10 (2013.01); B60T 8/172 (2013.01)
(58) Field of Classification Search
  CPC ................................. B60L 7/10; B60T 8/1708
  USPC .......................................................... 701/70
  See application file for complete search history.

(56) References Cited

U.S. PATENT DOCUMENTS

2015/0353063 A1 * 12/2015 Tuhro ................... B60T 8/1708
                                                        701/70
2022/0258708 A1 * 8/2022 Hanslik ..................... B60L 7/18

FOREIGN PATENT DOCUMENTS

DE        102019130200 A1    5/2021
DE        102021208426 A1 *  2/2023

OTHER PUBLICATIONS

German Office Action from counterpart DE1020231306642, dated Sep. 2, 2024.

* cited by examiner

*Primary Examiner* — Logan M Kraft
*Assistant Examiner* — Joshua Campbell

(57)                ABSTRACT

A vehicle system for a vehicle towing a trailer includes a trailer control module configured to control actuation of actuators of the trailer and a vehicle control module in communication with the trailer control module. The vehicle control module is configured to control actuation of actuators in the vehicle, determine an energy parameter associated with the vehicle when the trailer control module controls actuation of the actuators in the trailer based on an initial trailer condition, determine an actuation force when the trailer control module controls actuation of the actuators in the trailer based on the initial trailer condition, and generate a control signal for the trailer control module based on the actuation force to control actuation of the actuators of the trailer hitched to the vehicle. Other example vehicle systems and methods for vehicles towing trailers are also disclosed.

20 Claims, 6 Drawing Sheets

500

Start

502 — Receive Trailer Brake Gain

504 — Generate Control Signal Based On Trailer Brake Gain

506 — Determine Change In Regeneration Energy

508 — Determine Brake Force

510 — Adjust Trailer Brake Gain

512 — Generate Control Signal Based On Adjusted Trailer Brake Gain

514 — Is Regeneration Maximized?

N

Y

End

SYSTEMS AND METHODS FOR ADJUSTING A TRAILER BRAKE GAIN TO OPTIMIZE VEHICLE EFFICIENCY WHEN TOWING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for adjusting a trailer brake gain to optimize vehicle efficiency when towing.

An electric vehicle such as a battery electric vehicle, a hybrid vehicle, or a fuel cell vehicle includes one or more electric machines and a battery system. The battery system includes one or more battery cells. During use, the electric machines are operated as motors for propulsion and as generators for regeneration during braking. The electric vehicle may be attached to a trailer having brakes. In such scenarios, a trailer brake gain may be used to control the sensitivity of the trailer brakes when a driver actuates the vehicle brakes. The trailer brake gain may be set by a user according to the weight and load of the vehicle and the trailer.

SUMMARY

A vehicle system for an electric vehicle towing a trailer includes a trailer control module configured to control actuation of trailer brake actuators of the trailer hitched to the electric vehicle and a vehicle control module in communication with the trailer control module. The vehicle control module is configured to receive an initial trailer brake gain for the trailer hitched to the electric vehicle, determine a change in regeneration energy associated with regenerative braking of the electric vehicle when the trailer control module controls actuation of the trailer brake actuators based on the initial trailer brake gain, determine a brake force when the trailer control module controls actuation of the trailer brake actuators based on the initial trailer brake gain, adjust the trailer brake gain for the trailer hitched to the electric vehicle based on the change in regeneration energy, the brake force, and the initial trailer brake gain, and generate a control signal for the trailer control module based on the adjusted trailer brake gain to control actuation of the trailer brake actuators of the trailer hitched to the electric vehicle.

In other features, the vehicle control module is configured to determine a regeneration force based on the change in regeneration energy and the initial trailer brake gain and adjust the trailer brake gain based on the determined regeneration force.

In other features, the vehicle control module is configured to repeatedly adjust the trailer brake gain for the trailer hitched to the electric vehicle until the regeneration force is maximized.

In other features, the vehicle control module is configured to determine the regeneration force based on a learning model and a previously determined regeneration force.

In other features, the vehicle control module is configured to receive a lower trailer brake gain limit and an upper trailer brake gain limit and adjust the trailer brake gain between the lower trailer brake gain limit and the upper trailer brake gain limit based on the determined regeneration force.

In other features, the vehicle system further includes a display module in communication with the vehicle control module. The display module is configured to display an energy impact for the electric vehicle according to the adjusted trailer brake gain.

In other features, the vehicle system further includes an adaptive cruise control module in communication with the vehicle control module. The adaptive cruise control module is configured to receive the adjusted trailer brake gain and adjust a speed of the electric vehicle based on the adjusted trailer brake gain.

In other features, the vehicle control module is configured to determine the change in regeneration energy by determining a difference in the regeneration energy when brakes of the electric vehicle are not applied and when the brakes of the electric vehicle are applied.

In other features, the vehicle control module is configured to determine the change in regeneration energy based on a state of charge of a battery in the electric vehicle.

In other features, the vehicle control module is configured to determine the brake force by estimating a trailer brake force and a vehicle brake force based on an acceleration of the electric vehicle when the trailer control module controls actuation of the trailer brake actuators based on the initial trailer brake gain.

A method is disclosed for adjusting a trailer brake gain for a trailer hitched to an electric vehicle. The method includes receiving an initial trailer brake gain for the trailer hitched to the electric vehicle, determining a change in regeneration energy associated with regenerative braking of the electric vehicle when trailer brake actuators are controlled based on the initial trailer brake gain, determining a brake force when the trailer brake actuators are controlled based on the initial trailer brake gain, adjusting the trailer brake gain for the trailer hitched to the electric vehicle based on the change in regeneration energy, the brake force, and the initial trailer brake gain, and generating a control signal for a trailer control module based on the adjusted trailer brake gain to control actuation of the trailer brake actuators of the trailer hitched to the electric vehicle.

In other features, the method further includes determining a regeneration force based on the change in regeneration energy and the initial trailer brake gain.

In other features, adjusting the trailer brake gain for the trailer hitched to the electric vehicle includes adjusting the trailer brake gain based on the determined regeneration force.

In other features, the method further includes receiving a lower trailer brake gain limit and an upper trailer brake gain limit.

In other features, adjusting the trailer brake gain for the trailer hitched to the electric vehicle includes adjusting the trailer brake gain between the lower trailer brake gain limit and the upper trailer brake gain limit based on the determined regeneration force.

In other features, the method further includes determining displaying an energy impact for the electric vehicle according to the adjusted trailer brake gain and/or adjusting a speed of the electric vehicle controlled by an adaptive cruise control module based on the adjusted trailer brake gain.

In other features, determining the change in regeneration energy includes determining a difference in the regeneration energy when brakes of the electric vehicle are not applied and when the brakes of the electric vehicle are applied.

In other features, determining the brake force includes estimating a trailer brake force and a vehicle brake force based on an acceleration of the electric vehicle when the trailer control module controls actuation of the trailer brake actuators based on the initial trailer brake gain.

A vehicle system for a vehicle towing a trailer includes a trailer control module configured to control actuation of actuators of the trailer and a vehicle control module in communication with the trailer control module. The vehicle control module is configured to control actuation of actuators in the vehicle, determine an energy parameter associated with the vehicle when the trailer control module controls actuation of the actuators in the trailer based on an initial trailer condition, determine an actuation force when the trailer control module controls actuation of the actuators in the trailer based on the initial trailer condition, and generate a control signal for the trailer control module based on the actuation force to control actuation of the actuators of the trailer hitched to the vehicle.

In other features, the energy parameter associated with the vehicle includes a state of charge of a battery in the vehicle.

In other features, the actuation force includes a brake force.

In other features, the initial trailer condition includes a condition associated with trailer braking.

In other features, the condition associated with trailer braking includes an initial trailer brake gain.

In other features, the vehicle control module is configured to adjust the initial trailer condition based on the actuation force and generate the control signal for the trailer control module based on the adjusted initial trailer condition.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An electric vehicle (EV) such as a battery electric vehicle, a hybrid vehicle, or a fuel cell vehicle includes one or more electric machines that are operated as motors for propulsion and as generators for power regeneration during braking. A battery system in the EV discharges when the electric machines are operated as motors and charges when the electric machines are operated as generators. A range of the EV may vary based on numerous parameters, such as characteristics of the EV, the battery system, etc. Additionally, the EV range may significantly decrease while trailering. For example, towing a heavy trailer may result in up to 45% less range as compared to the EV range without the trailer. As such, the range drop while trailering may be substantially limiting for EVs.

The vehicle systems and methods according to the present disclosure provide technical solutions for improving efficiency of towing for a vehicle (e.g., an EV, etc.) by adaptatively adjusting a trailer condition (e.g., a trailer brake gain, etc.) for a trailer to maximize an energy parameter (e.g., power regeneration of a battery system) associated with the vehicle while keeping the vehicle and trailer safe. In such examples, an optimal trailer brake gain or another trailer condition may be identified based on, for example, a learning model, that maximizes the recovered energy while maintaining trailer stability. By employing the vehicle systems and methods herein, an EV towing a trailer may exhibit an increased energy recovery (e.g., a 20% energy recovery) from braking as compared to conventional systems.

Figure 1:
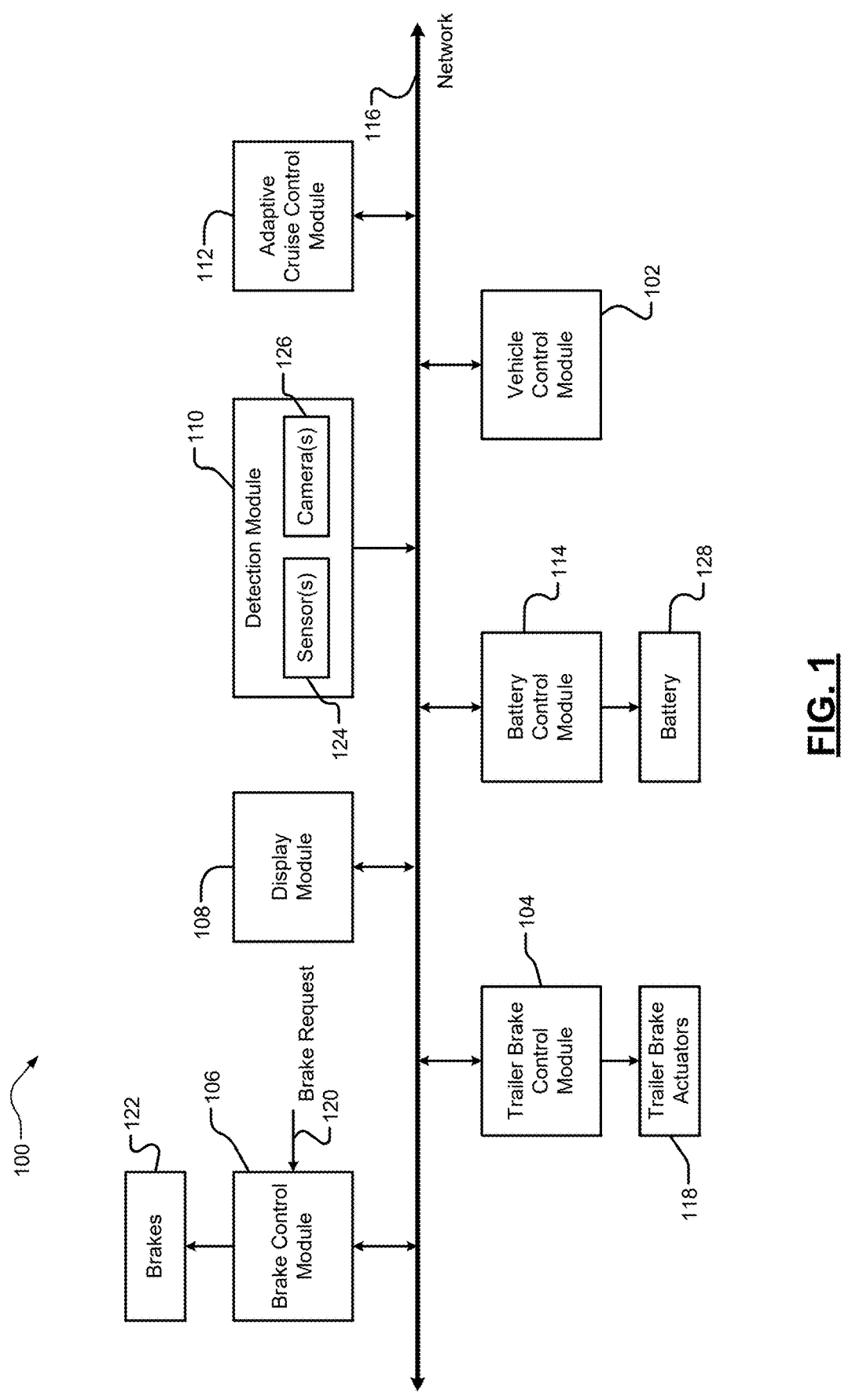
FIG. 1 is a functional block diagram of an example vehicle system for adjusting a trailer brake gain for a trailer, according to the present disclosure.

Referring now to FIG. 1, a block diagram of an example vehicle system 100 is presented for an EV towing a trailer. The vehicle system 100 of FIG. 1 may be employable in any suitable EV, such as a battery electric vehicle, a hybrid vehicle, a fuel cell vehicle, etc. Additionally, the vehicle system 100 may be applicable to an autonomous vehicle, a semi-autonomous vehicle, or a non-autonomous vehicle. While the vehicle system 100 is described herein relative to an EV, it should be appreciated that the vehicle system 100 may be employable in other suitable vehicles, such as internal combustion engine vehicles if desired.

The trailer attached (e.g., hitched, etc.) to the EV may be any suitable type of trailer that has brakes controllable based on a trailer brake gain. In various embodiments, the trailer may be attached to the EV via a trailer hitch. For example, the trailer hitch may be attached to a frame of the EV (e.g., via bolts, etc.). The trailer hitch may be shaped, sized, etc. to accommodate the mounting of a trailer tongue having a ball, an opening, etc. The trailer includes a corresponding structure for attaching to the ball, the opening, etc.

The vehicle system 100 generally includes a vehicle control module 102 and a trailer brake control module 104 in communication with the vehicle control module 102. As further explained below, the vehicle control module 102 adjusts a trailer brake gain (or another suitable trailer condition) for the trailer hitched to the EV until an optimal value is identified to maximize power regeneration of a vehicle battery. For example, in conventional towing scenarios, a trailer brake gain is set to cause a trailer to begin stopping before vehicle brakes cause a vehicle towing the trailer to stop. This helps the vehicle to stop but causes the trailer to absorb energy. However, when the vehicle control module 102 herein optimizes the trailer brake gain for the trailer hitched to the EV, the trailer safely pushes the EV when the vehicle brakes are applied. In doing so, energy is passed from the trailer to the EV (and more specifically to the vehicle brakes) to increase power regeneration in the EV. As such, the trailer may be actuated to increase the efficiency of energy consumption in the EV (or more generally, the vehicle). The optimal trailer brake gain to maximize power regeneration in the EV may change when a load (e.g., cargo) carried by the trailer changes, when another (different) trailer is towed by the EV, when the EV travels through different terrains, etc.

As shown in FIG. 1, the vehicle system 100 further includes one or more optional modules and sensors in communication with the vehicle control module 102. For example, the optional modules may include a brake control module 106, a display module 108, a detection module 110, an adaptive cruise control module 112, and a battery control module 114, as shown in FIG. 1. Although FIG. 1 illustrates the vehicle system 100 as including specific modules and sensors, it should be appreciated that one or more other modules and/or sensors may be employed if desired. Additionally, while the vehicle system 100 is shown as including multiple separate modules (e.g., the vehicle control module 102, the trailer brake control module 104, etc.), any combination of the modules and/or the functionality thereof may be integrated into one or more modules.

The modules and sensors of the vehicle system 100 may share parameters via a network 116, such as a controller (or car) area network (CAN). In such examples, the parameters may be shared via one or more data buses of the network 116. As such, various parameters may be made available by a given module and/or sensor to other modules and/or sensors via the network 116.

In various embodiments, the trailer brake control module 104 controls actuation of trailer brake actuators 118 on the trailer hitched to the EV. Actuation of the trailer brake actuators 118 may apply mechanical (friction) brakes of the trailer. In such examples, control of the trailer brake actuators 118 is based on the trailer brake gain as determined by the vehicle control module 102. The trailer brake gain may be used to control the sensitivity of the trailer brakes when a driver actuates the vehicle brakes by adjusting the amount of power (e.g., current) applied to the trailer brake actuators 118 from a vehicle battery.

Figure 2:
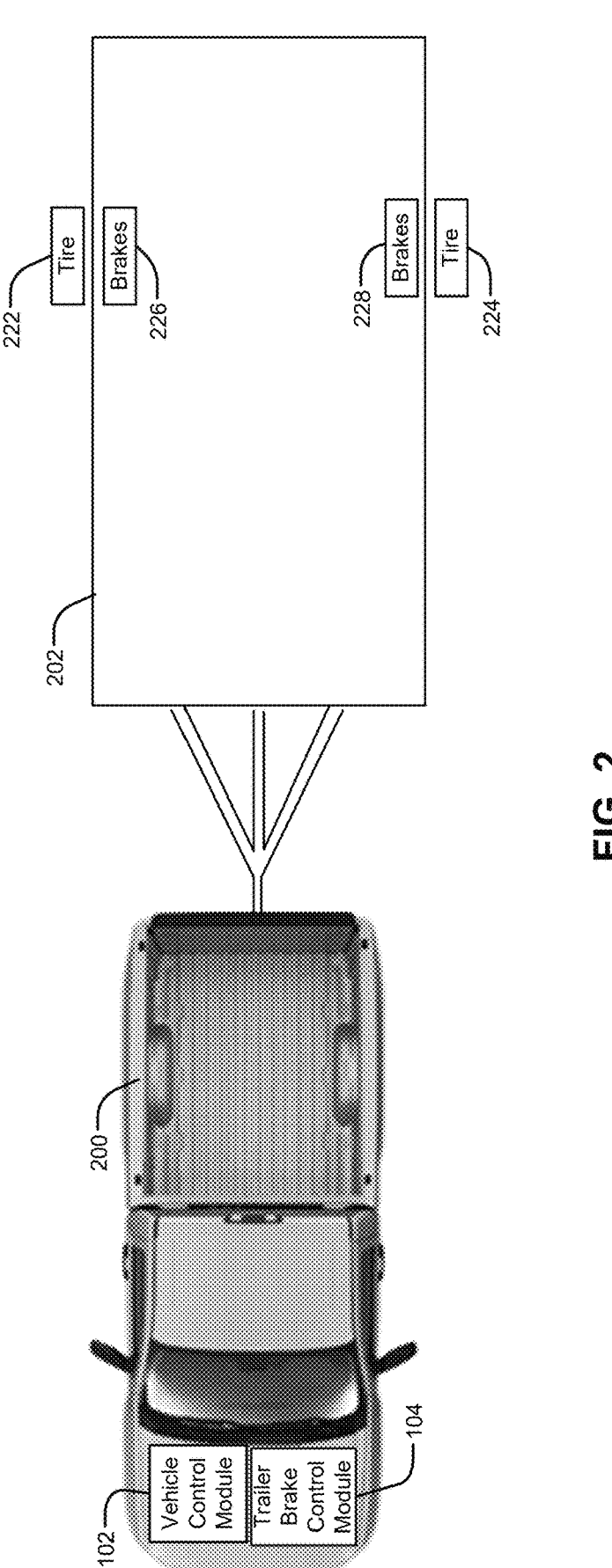
FIG. 2 is a top view of a trailer hitched to an electric vehicle according to the present disclosure.

For example, FIG. 2 depicts an EV 200 and a trailer 202 hitched to the EV 200. As shown, the EV 200 (e.g., a truck) includes the vehicle control module 102 and the trailer brake control module 104 of FIG. 1. The trailer 202 includes tires 222, 224 and brakes 226, 228 associated with the tires 222, 224. The trailer brake control module 104 controls the brakes 226, 228 based on a trailer brake gain that is determined by the vehicle control module 102. Although the EV 200 of FIG. 2 is shown as a truck, it should be appreciated that another suitable type of EV may be employed, such as a sports utility vehicle, a van, a car, etc. Additionally, while the EV 200 is shown as including the trailer brake control module 104, it should be appreciated that the trailer 202 may include the trailer brake control module 104 if desired.

With continued reference to FIG. 1, the brake control module 106 may selectively control (e.g., friction) brakes 122 of the EV based on one or more inputs, such as a brake request 120. For example, the brake request 120 may be generated based on a driver applying a force to a brake pedal in the EV. In such examples, the brake request 120 may be a brake pedal position signal. In other examples, the brake request 120 may be provided by a driver assistance system in the EV. For example, the adaptive cruise control module 112 may provide the brake request 120 based on processed data from the detection module 110.

In FIG. 1, the EV includes regenerative braking. For example, the brakes 122 may be any suitable type of regenerative brakes that convert kinetic energy used to slow down the EV into electrically energy for charging one or more batteries 128 in the EV.

The battery control module 114 of FIG. 1 generally controls charging and discharging of the one or more batteries 128. For example, the battery control module 114 may enable charging of the batteries 128 when the brakes 122 are actuated, the EV is attached to a charging system (e.g., for receiving external power), etc. Additionally, the battery control module 114 may enable discharging of the batteries 128 to power components in the EV, the trailer brake actuators 118 of the trailer, etc. In various embodiments, the battery control module 114 may include one or more controllable power converters (e.g., bi-directional power converters) for regulating an electrical characteristic (e.g., a voltage, a current, etc.) provided to and/or by the batteries 128.

The detection module 110 may generally receive data relating to components in the EV and/or the environment external to the EV. For example, the detection module 110 may collect data indicative of detected objects, road conditions, weather conditions, etc. for use in controlling various driver assistance systems (e.g., an adaptive cruise control system, etc.). Additionally, the detection module 110 may collect data indicative of battery characteristics, whether the EV is connected to a trailer, a velocity (or speed) of the EV, an acceleration of the EV, etc. In such examples, the detection module 110 may include one or more detection devices for collecting such data. The detection devices may include, for example, one or more sensors 124 and/or cameras 126 mounted on the exterior and/or interior of the EV.

In various embodiments, the one or more sensors 124 may be employed to sense battery characteristics. For example, the sensor(s) 124 may sense a battery voltage, a battery current, etc. In such examples, the vehicle control module 102 may employ the battery voltage, the battery current, etc. to determine a state of charge of the batteries 128. Additionally, in some examples, the sensor(s) 124 may be used to determine a regeneration status and/or a capacity of the batteries 128. In other examples, the battery control module 114 may include one or more sensors for sensing the battery characteristics and/or provide the state of charge of the batteries 128, the regeneration status, the battery capacity, etc. to the vehicle control module 102.

In FIG. 1, the display module 108 may include any suitable device in communication with the vehicle control module 102 for displaying information. For example, the display module 108 may include a user interactive display of an entertainment center adjacent to a driver, a user device (e.g., a cell phone, tablet, etc.) in communication with the vehicle control module 102 (via the network 116), etc.

In such examples, the display module 108 may display, among other things, information about the EV with respect to a trailer brake gain used for controlling the brakes of the trailer. For example, the display module 108 may display an energy impact for the EV according to an adjusted trailer brake gain as determined by the vehicle control module 102, as further explained below. Additionally, the display module 108 may also display a representation of the data collected by the detection module 110. For example, the display module 108 may show different camera views, a virtual birds-eye view of the EV, hazards, notifications, maps, etc.

With continued reference to FIG. 1, the vehicle control module 102 receives an initial trailer brake gain for the trailer hitched to the EV. For example, the initial trailer brake gain may be set through user input on the display module 108. In such examples, the user (e.g., the driver) may select or otherwise provide a value (e.g., 0-10, etc.) for the trailer brake gain. In other examples, the initial trailer brake gain may be a default value set during a manufacturer process of the EV, and provided to the vehicle control module 102 when a trailer (e.g., the trailer 202 of FIG. 2) is detected as being connected to the EV (e.g., the EV 200 of FIG. 2). In still other examples, the trailer brake control module 104 may provide a default value of the trailer brake gain to the vehicle control module 102.

The vehicle control module 102 may also receive a signal indicating that application of the brakes 122 of the EV were detected. For example, the brake control module 106 may provide the signal to the vehicle control module 102 after the brake request 120 is received. In other examples, the vehicle control module 102 may receive the brake request 120. Once the vehicle control module 102 detects application of the brakes 122, adjustment of the received trailer brake gain may begin. In doing so, the vehicle control module 102 may determine various parameters associated with the vehicle batteries, the vehicle brakes, the trailer brakes, etc.

For example, the vehicle control module 102 determines a change in regeneration energy associated with regenerative braking of the EV when the trailer brake control module 104 controls actuation of the trailer brake actuators 118. In such examples, the determination of the change in regeneration energy is based on the initial trailer brake gain. In such examples, the change in regeneration energy may be determined based on a difference in the regeneration energy when the vehicle brakes 122 are not applied and when the vehicle brakes 122 are applied.

In various embodiments, the regeneration energy may be determined or represented based on various battery parameters. For example, the regeneration energy may be represented based on a state of charge of the vehicle batteries 128. As such, in this example, the change in regeneration energy may be determined by comparing the state of charge at an instant in time when the vehicle brakes 122 are not applied and the state of charge at later instant in time when the vehicle brakes 122 are applied.

Figure 3:
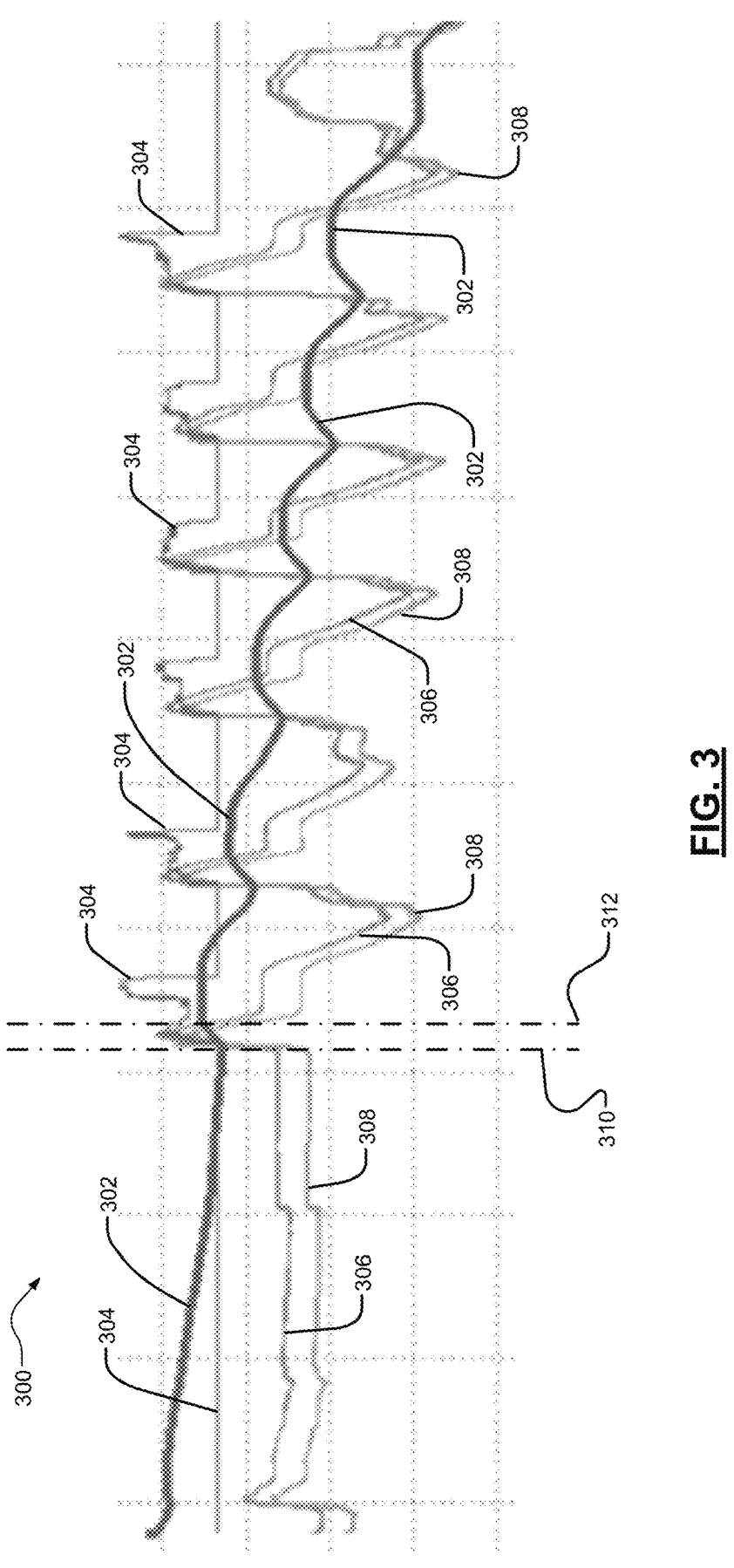
FIG. 3 is a graph showing parameters of batteries and brakes of an electric vehicle according to the present disclosure.

For example, FIG. 3 depicts a graph 300 showing various parameters associated with the EV over time. Specifically, the graph 300 shows a state of the charge 302 of the batteries 128, a detected pressure 304 applied to a brake pedal for actuating the brakes 122, a voltage 306 of the batteries 128, and a current 308 of the batteries 128. As shown, when the brake pedal is applied (shown by an increase in the pressure 304), the state of the charge 302 of the batteries 128 increases due to regenerative braking. In such examples, one instance of a change in the state of charge (representing a change in regeneration energy) is highlighted by vertical lines 310, 312. For example, the line 310 represents an instant in time when the vehicle brakes 122 are not applied and the state of the charge 302 is at a local minimal. Likewise, the line 312 represents an instant in time when the vehicle brakes 122 are applied and the state of the charge 302 is at a local maximum. In this example, the change in regeneration energy is determined by calculating a difference between of the values of the state of the charge 302 at the lines 310, 312.

With continued reference to FIG. 1, the vehicle control module 102 also determines a brake force when the trailer brake control module 104 controls actuation of the trailer brake actuators 118 according to the initial trailer brake gain. In such examples, the brake force may represent a trailer brake force and a vehicle brake force. In various embodiments, the brake force may be determined by estimating the trailer brake force and the vehicle brake force based on an acceleration of the EV (e.g., the EV 200 of FIG. 2). For example, the acceleration (e.g., a deacceleration) of the EV may be calculated based on the velocity of the EV, etc. Then, the vehicle control module 102 may estimate the brake force based on the acceleration of the EV and a known mass of the EV.

Then, the vehicle control module 102 adjusts the trailer brake gain for the trailer hitched to the EV based on the change in regeneration energy, the brake force, and the initial trailer brake gain. In various embodiments, the vehicle control module 102 may employ a learning model (e.g., a machine learning model) to adjust the trailer brake gain for the trailer. For example, the vehicle control module 102 may employ a filter, such as a stochastic filter to learn and determine a regeneration force.

As one example, the vehicle control module 102 may determine the regeneration force according to equation (1) below. In such examples, $f_{r,k}$ represents a current regeneration force. As shown, the regeneration force ($f_{r,k}$) is determined based on a previous regeneration force ($f_{r,k-1}$), a learning gain ($\alpha_k$), the change in regeneration energy ($E_r$), and the current trailer brake gain ($g_b$). In such examples, the estimated brake force may be employed to determine the previous regeneration force ($f_{r,k-1}$). Additionally, the learning gain ($\alpha_k$) is an update rate in the filter, which may be adjusted based on the variance of the data to make the filter robust.

$$f_{r,k} = f_{r,k-1} + \alpha_k (E_r - g_b \times f_{r,k-1}) \qquad (1)$$

Then, the vehicle control module 102 may adjust the trailer brake gain based on the determined regeneration force. The vehicle control module 102 adjusts the trailer brake gain in an attempt to find the optimal value of the trailer brake gain to maximize power regeneration in the EV. For example, the vehicle control module 102 may obtain an optimal trailer brake gain according to equation (2) below. In such examples, $g_b^*$ represents an adjusted trailer brake gain.

$$g_b^* = \max_{g_b} \sum f_r(g_b) \qquad (2)$$

The vehicle control module 102 may repeatedly adjust the trailer brake gain until the regeneration force is maximized. For example, the vehicle control module 102 may provide a first adjusted trailer brake gain (e.g., determined based on the initial trailer brake gain) to the trailer brake control module 104 or generate a control signal for the trailer brake control module 104 based on the first adjusted trailer brake gain. Then, once a braking event occurs again, the vehicle control module 102 determines a subsequent change in regeneration energy and a subsequent brake force according to the first adjusted trailer brake gain. The vehicle control module 102 then may determine a new regeneration force according to equation (1) above and a new adjusted trailer brake gain. This repeated adjustment cycle may continue until the optimal value of the trailer brake gain is identified to maximize power regeneration in the EV according to equation (2) above.

In the example of FIG. 1, the adjustment and optimization of the trailer brake gain may be maintained between limits. For example, the vehicle control module 102 may receive or otherwise determine a lower trailer brake gain limit and an upper trailer brake gain limit. In such examples, the trailer brake gain limits may be determined based on one or more parameters associated with the trailer, such as safety constraints, trailer ratings, etc. For example, if the trailer brake gain is too low, the EV will have to brake harder to stop the EV and the trailer combination. Conversely, if the trailer brake gain is too high, the trailer brakes may lock the trailer wheels. Such scenarios cause undesirable increases in safety risks and/or damage to the EV brakes 122, the trailer brakes, the trailer wheels, etc. As such, to prevent such undesirable actions, minimum and maximum values of the trailer brake gain may be set.

Figure 4:
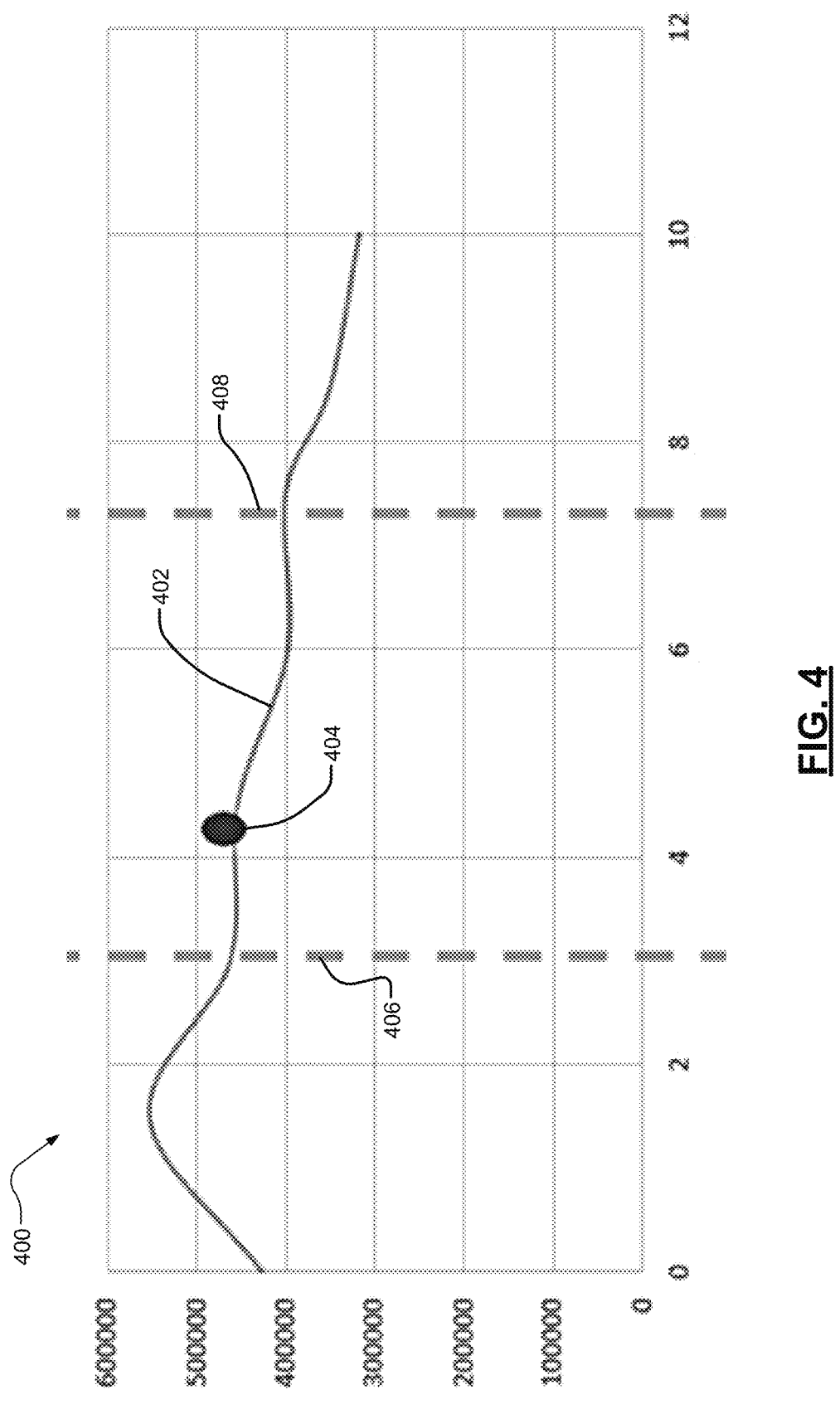
FIG. 4 is a graph showing a regeneration force as a function of a change in regeneration energy and a trailer brake gain according to the present disclosure.

For example, FIG. 4 depicts a graph 400 showing a line 402 representing the regeneration force ($f_r$) as a function of the change in regeneration energy ($E_r$) and the trailer brake gain. In this example, the y-axis of the graph 400 represents the change in regeneration energy ($E_r$) and the x-axis of the graph 400 represents the trailer brake gain. Additionally, the graph 400 includes a lower trailer brake gain limit ($g_b$) and an upper trailer brake gain limit ($g_{bs}$). The lower trailer brake gain limit ($g_b$) is represented by a vertical dashed line 406 and the upper trailer brake gain limit ($g_{bs}$) is represented by a vertical dashed line 408. The trailer brake gain is adjusted until an optimal value ($g_b$*) is identified to maximize power regeneration. In this example, the optimal value ($g_b$*) of the trailer brake gain is identified by a point 404, which represents a local maximum of the regeneration force between the lower trailer brake gain limit (the line 406) and the upper trailer brake gain limit (the line 408).

With continued reference to FIG. 1, the vehicle control module 102 may provide the trailer brake gain or a representation thereof to various components in the vehicle system 100. For example, and as referenced above, the vehicle control module 102 may generate a signal for the trailer brake control module 104 based on the adjusted (and eventually optimized) trailer brake gain. The trailer brake control module 104 may then control actuation of the trailer brake actuators 118 according to the adjusted (e.g., optimized) trailer brake gain.

Additionally, in some examples, the vehicle control module 102 may utilize the adjusted trailer brake gain for other applications. For example, the adaptive cruise control module 112 generally controls a speed of the EV to maintain a desired distance between the EV and objects (e.g., other vehicles) in a path of the EV. The adaptive cruise control module 112 may rely on a speed profile for controlling the EV. In various embodiments, the speed profile for the EV may be shaped according to the adjusted trailer brake gain received from the vehicle control module 102 to control a speed of the EV.

In other examples, the adjusted trailer brake gain may be used by other driver assistance applications, such as autonomous applications and semi-autonomous applications. For example, an autonomous or semi-autonomous application may adjust a planned path based on the adjusted trailer brake gain to systematically maximize the towing energy consumption efficiency. In such examples, the application may configure a path planning algorithm to include an energy consumption reduction mechanism (e.g., regenerative braking), and configure an automated driving command to incorporate towing energy consumption.

Further, the vehicle control module 102 may determine an energy impact for the EV when using the adjusted trailer brake gain. For example, the vehicle control module 102 may calculate an increase in the regeneration energy, an increase in range of the EV, and/or another energy impact caused by the adjusted trailer brake gain. Then, the vehicle control module 102 may provide the determined energy impact and the adjusted trailer brake gain to the display module 108. In response, the display module 108 can display the energy impact and the adjusted trailer brake gain as user feedback.

With continued reference to FIG. 1, the vehicle system 100 is generally described above relative to control of trailer brakes (e.g., trailer brake actuators) based on trailer brake gains. However, it should be appreciated that in other embodiments, the vehicle system 100 may be applicable for control of other actuators besides brake actuators. In such examples, the vehicle control module 102 may control actuation of actuators in the vehicle and/or the trailer.

For example, the vehicle control module 102 may determine an energy parameter associated with the vehicle when the trailer control module controls actuation of actuators in the trailer based on an initial trailer condition (or a vehicle control command), and then determine an actuation force when the trailer control module controls actuation of the actuators in the trailer based on the initial trailer condition. In such examples, the energy parameter associated with the vehicle may include any suitable parameter, such as a state of charge of the battery, etc. Additionally, the actuation force may be any suitable force associated with the actuators (e.g., the trailer actuators). Further, the initial trailer condition may be a vehicle control command, such as a condition associated with trailer braking (e.g., a trailer brake gain, etc. as explained herein). In other examples, the initial trailer condition may include another suitable condition related to the trailer generally pushing and/or pulling the vehicle.

The vehicle control module 102 may then generate a control signal for the trailer control module based on the actuation force to control actuation of the actuators of the trailer hitched to the vehicle. For example, the vehicle control module 102 may adjust the initial trailer condition (e.g., a condition associated with trailer braking) based on the actuation force (e.g., a braking force, etc.) and then generate the control signal for the trailer control module based on the adjusted initial trailer condition. In such examples, the adjusted trailer condition may be optimized as explained herein to increase energy recovery and/or reduce fuel consumption.

Figure 5:
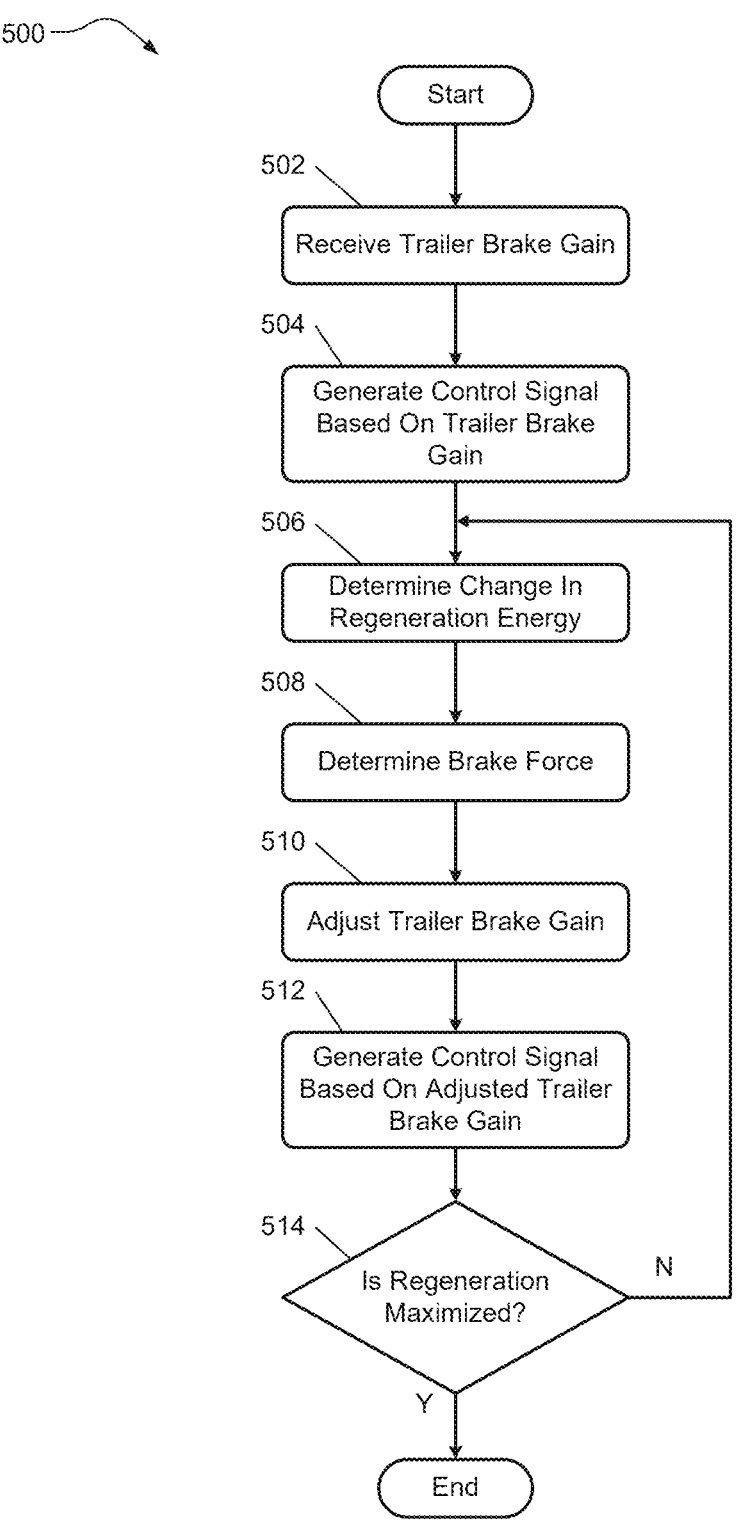
FIGS. 5-6 are flowcharts of example control processes for adjusting a trailer brake gain for a trailer, according to the present disclosure.
Figure 6:
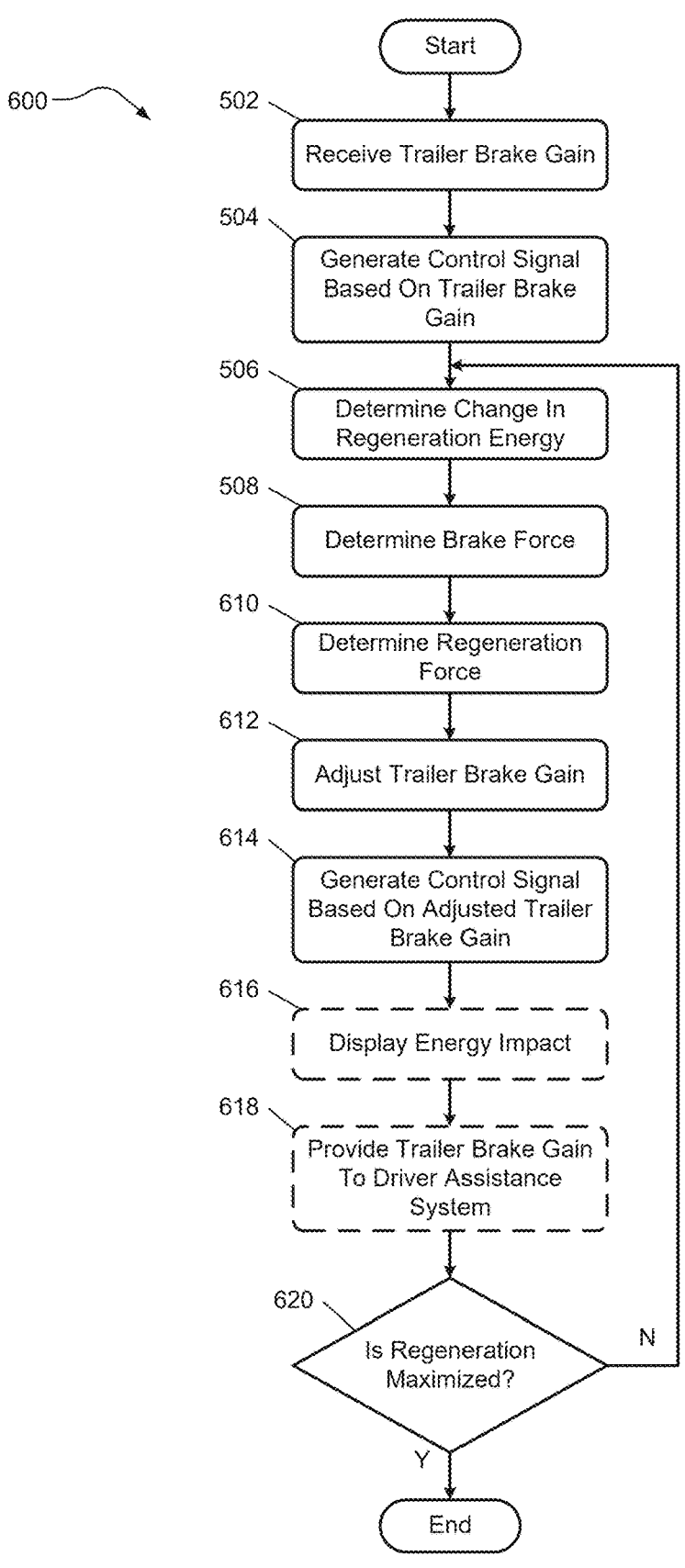

FIGS. 5-6 illustrate example control processes 500, 600 employable by the vehicle system 100 of FIG. 1 for adjusting a trailer brake gain for a trailer hitched to an EV, such as the trailer 202 and the EV 200 of FIG. 2. Although the example control processes 500, 600 are described in relation to the vehicle system 100 of FIG. 1 including the vehicle control module 102, any one of the control processes 500, 600 may be employable by any suitable system.

As shown in FIG. 5, the control process 500 begins at 502 where the vehicle control module 102 receives a trailer brake gain. In some examples, the trailer brake gain may be provided (e.g., input on the display module 108) by a user, set by a manufacturer (e.g., a default trailer brake gain), etc. as explained above. Control then proceeds to 504.

At 504, the vehicle control module 102 generates a control signal based on the trailer brake gain received at 502. The control signal may be provided to the trailer brake control module 104 for use in controlling the trailer brake actuators 118, as explained above. In other examples, the trailer brake control module 104 may receive trailer brake gain and generate the control signal. Control then proceeds to 506, 508.

At 506, the vehicle control module 102 determines a change in regeneration energy. For example, the regeneration energy may be represented by a state of charge of the batteries 128, and the vehicle control module 102 may calculate a difference in the state of charge of the batteries 128 when the vehicle brakes 122 are applied and the state of charge of the batteries 128 when the vehicle brakes 122 not applied, as explained above. At 508, the vehicle control module 102 determines a brake force by, for example, estimating a combined vehicle brake force and trailer brake force as explained above. The change in regeneration energy and the brake force are determined when the trailer brake control module 104 employs the received trailer brake gain. Control then proceeds to 510.

At 510, the vehicle control module 102 adjusts the trailer brake gain based on the change in regeneration energy and the brake force. For example, the vehicle control module 102 may employ a learning model to adjust the trailer brake gain for the trailer, as explained above. Control then proceeds to 512.

At 512, the vehicle control module 102 generates another control signal based on the adjusted trailer brake gain. The new control signal may be provided to the trailer brake control module 104 for use in controlling the trailer brake actuators 118, as explained above. Control then proceeds to 514.

At 514, the vehicle control module 102 determines whether the adjusted trailer brake gain causes the power regeneration of the batteries 128 to be maximized. For example, by employing the learning model (e.g., with stochastic filtering, etc.), the vehicle control module 102 may identify a power regeneration that changes as a function of the trailer brake gain. If the power regeneration is maximized, the trailer brake gain may be an optimal value and control may end as shown in FIG. 5. If, however, the power regeneration is not maximized, control may return to 506 as shown in FIG. 5. Then, the vehicle control module 102 may further adjust the trailer brake gain based on a newly determined change in regeneration energy and brake force.

The control process 600 of FIG. 6 is similar to the control process 500 of FIG. 5, but with additional and/or alternative control features. For example, the control process 600 of FIG. 6 includes the steps 502, 504, 506, 508 as explained above relative the control process 500 of FIG. 5. Then, control proceeds to 610.

At 610, the vehicle control module 102 determines a regeneration force based on the existing trailer brake gain, the change in regeneration energy, and the brake force received and/or determined in 502, 506, 508. For example, the regeneration force may be determined according to equation (1) above. Control then proceeds to 612, 614.

At 612, the vehicle control module 102 adjusts the trailer brake gain based on the regeneration force. In some examples, the trailer brake gain may be adjusted according to equation (2) above. At 614, the vehicle control module 102 generates another control signal based on the adjusted trailer brake gain as explained above. The new control signal may be provided to the trailer brake control module 104 for use in controlling the trailer brake actuators 118. Control then proceeds to 616.

At 616, the vehicle control module 102 may optionally determine an energy impact for the EV when using the adjusted trailer brake gain. For example, the vehicle control module 102 may calculate an increase in the regeneration energy, an increase in range of the EV, and/or another energy impact caused by the adjusted trailer brake gain, and then cause display of the energy impact on the display module 108. Control then proceeds to 618.

At 618, the vehicle control module 102 may optionally provide the adjusted trailer brake gain to a driver assistance system, such as an adaptive cruise control system in the EV. For example, and as explained above, the vehicle control module 102 may provide the adjusted trailer brake gain to the adaptive cruise control module 112. In turn, the adaptive cruise control module 112 may utilize the adjusted trailer brake gain to shape a speed profile for (e.g., adjust a speed of) the EV when an adaptive cruise control application is employed. Control then proceeds to 620.

At 620, the vehicle control module 102 determines whether the adjusted trailer brake gain causes the power regeneration of the batteries 128 to be maximized. For example, by employing the learning model (e.g., with stochastic filtering, etc.), the vehicle control module 102 may identify a power regeneration that changes as a function of the trailer brake gain and then use this to obtain an optimal trailer brake gain for maximizing the power regeneration of the batteries 128. If the power regeneration is maximized, the trailer brake gain may be an optimal value and control may end as shown in FIG. 6. If, however, the power regeneration is not maximized, control may return to 506 as shown in FIG. 6. Then, the vehicle control module 102 may further adjust the trailer brake gain, as explained herein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for an electric vehicle towing a trailer, the vehicle system comprising:
   a trailer control module configured to control actuation of trailer brake actuators of the trailer hitched to the electric vehicle; and
   a vehicle control module in communication with the trailer control module, the vehicle control module configured to:
      receive an initial trailer brake gain for the trailer hitched to the electric vehicle, wherein the trailer brake gain is a value for controlling sensitivity of the trailer brake actuators when brakes of the electric vehicle are applied;
      determine a change in regeneration energy associated with regenerative braking of the electric vehicle based on a difference in a state of charge of a battery in the electric vehicle when the brakes of the electric vehicle are not applied and when the brakes of the electric vehicle are applied and the trailer control module controls actuation of the trailer brake actuators based on the initial trailer brake gain;
      determine a brake force when the trailer control module controls actuation of the trailer brake actuators based on the initial trailer brake gain;
      adjust the trailer brake gain for the trailer hitched to the electric vehicle based on the change in regeneration energy, the brake force, and the initial trailer brake gain; and
      generate a control signal for the trailer control module based on the adjusted trailer brake gain to control actuation of the trailer brake actuators of the trailer hitched to the electric vehicle.

2. The vehicle system of claim 1, wherein the vehicle control module is configured to:
   determine a regeneration force based on the change in regeneration energy and the initial trailer brake gain; and
   adjust the trailer brake gain based on the determined regeneration force.

3. The vehicle system of claim 2, wherein the vehicle control module is configured to repeatedly adjust the trailer brake gain for the trailer hitched to the electric vehicle until the regeneration force is maximized.

4. The vehicle system of claim 3, wherein the vehicle control module is configured to determine the regeneration force based on a learning model and a previously determined regeneration force.

5. The vehicle system of claim 2, wherein the vehicle control module is configured to:

receive a lower trailer brake gain limit and an upper trailer brake gain limit; and adjust the trailer brake gain between the lower trailer brake gain limit and the upper trailer brake gain limit based on the determined regeneration force.

6. The vehicle system of claim 1, further comprising a display module in communication with the vehicle control module, the display module configured to display an energy impact for the electric vehicle according to the adjusted trailer brake gain.

7. The vehicle system of claim 1, further comprising an adaptive cruise control module in communication with the vehicle control module, the adaptive cruise control module configured to receive the adjusted trailer brake gain and adjust a speed of the electric vehicle based on the adjusted trailer brake gain.

8. The vehicle system of claim 1, wherein the vehicle control module is configured to determine the brake force by estimating a trailer brake force and a vehicle brake force based on an acceleration of the electric vehicle when the trailer control module controls actuation of the trailer brake actuators based on the initial trailer brake gain.

9. A method for adjusting a trailer brake gain for a trailer hitched to an electric vehicle, the method comprising:

receiving an initial trailer brake gain for the trailer hitched to the electric vehicle, wherein the trailer brake gain is a value for controlling sensitivity of trailer brake actuators of the trailer when brakes of the electric vehicle are applied;

determining a change in regeneration energy associated with regenerative braking of the electric vehicle based on a difference in a state of charge of a battery in the electric vehicle when the brakes of the electric vehicle are not applied and when the brakes of the electric vehicle are applied and the trailer brake actuators are controlled based on the initial trailer brake gain;

determining a brake force when the trailer brake actuators are controlled based on the initial trailer brake gain;

adjusting the trailer brake gain for the trailer hitched to the electric vehicle based on the change in regeneration energy, the brake force, and the initial trailer brake gain; and generating a control signal for a trailer control module based on the adjusted trailer brake gain to control actuation of the trailer brake actuators of the trailer hitched to the electric vehicle.

10. The method of claim 9, further comprising determining a regeneration force based on the change in regeneration energy and the initial trailer brake gain, wherein adjusting the trailer brake gain for the trailer hitched to the electric vehicle includes adjusting the trailer brake gain based on the determined regeneration force.

11. The method of claim 10, further comprising receiving a lower trailer brake gain limit and an upper trailer brake gain limit, wherein adjusting the trailer brake gain for the trailer hitched to the electric vehicle includes adjusting the trailer brake gain between the lower trailer brake gain limit and the upper trailer brake gain limit based on the determined regeneration force.

12. The method of claim 9, further comprising:

displaying an energy impact for the electric vehicle according to the adjusted trailer brake gain; and/or adjusting a speed of the electric vehicle controlled by an adaptive cruise control module based on the adjusted trailer brake gain.

13. The method of claim 9, wherein determining the brake force includes estimating a trailer brake force and a vehicle brake force based on an acceleration of the electric vehicle when the trailer control module controls actuation of the trailer brake actuators based on the initial trailer brake gain.

14. A vehicle system for a vehicle towing a trailer, the vehicle system comprising:

a trailer control module configured to control actuation of actuators of the trailer; and a vehicle control module in communication with the trailer control module, the vehicle control module configured to:

control actuation of actuators in the vehicle;

determine a change in a state of charge of a battery in the vehicle when brakes of the vehicle are not applied and when the brakes of the vehicle are applied and the trailer control module controls actuation of the actuators in the trailer based on an initial trailer brake gain, wherein the trailer brake gain is a value for controlling sensitivity of the actuators of the trailer when the brakes of the vehicle are applied;

determine an actuation force when the trailer control module controls actuation of the actuators in the trailer based on the initial trailer brake gain;

adjust the trailer brake gain for the trailer hitched to the vehicle based on the change in the state of charge of the battery, the actuation force, and the initial trailer brake gain; and generate a control signal for the trailer control module based on the adjusted trailer brake gain to control actuation of the actuators of the trailer hitched to the vehicle.

15. The vehicle system of claim 14, wherein the actuation force includes a brake force.

16. The vehicle system of claim 15, wherein the vehicle control module is configured to determine the brake force by estimating a trailer brake force and a vehicle brake force based on an acceleration of the vehicle when the trailer control module controls actuation of trailer brake actuators based on the initial trailer brake gain.

17. The vehicle system of claim 16, wherein the vehicle control module is configured to:

receive a lower trailer brake gain limit and an upper trailer brake gain limit; and adjust the trailer brake gain between the lower trailer brake gain limit and the upper trailer brake gain limit.

18. The vehicle system of claim 17, further comprising a display module in communication with the vehicle control module, the display module configured to display an energy impact for the vehicle according to the adjusted trailer brake gain.

19. The vehicle system of claim 14, further comprising an adaptive cruise control module in communication with the vehicle control module, the adaptive cruise control module configured to receive the adjusted trailer brake gain and adjust a speed of the vehicle based on the adjusted trailer brake gain.

20. The vehicle system of claim 14, further comprising a display module in communication with the vehicle control module, the display module configured to display an energy impact for the vehicle according to the adjusted trailer brake gain.

* * * * *